United States Patent
McGee et al.

(10) Patent No.: US 8,031,632 B2
(45) Date of Patent: Oct. 4, 2011

(54) METHOD AND SYSTEM OF IMPLEMENTING VIRTUAL LOCAL AREA NETWORKS (VLANS) WITH TEAMED COMMUNICATION PORTS

(75) Inventors: Michael Sean McGee, Austin, TX (US); Jeffrey D. Allen, Atlanta, GA (US); Mark C. Stratton, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 688 days.

(21) Appl. No.: 11/468,442

(22) Filed: Aug. 30, 2006

(65) Prior Publication Data

US 2008/0205409 A1    Aug. 28, 2008

(51) Int. Cl.
  *H04L 12/28* (2006.01)
(52) U.S. Cl. ........................................................ 370/254
(58) Field of Classification Search .................. 370/229, 370/230, 230.1, 231–235, 395.4, 395.41, 370/395.53, 463
See application file for complete search history.

(56) References Cited

U.S. PATENT DOCUMENTS

| | | | | |
|---|---|---|---|---|
| 5,959,989 A | * | 9/1999 | Gleeson et al. | 370/390 |
| 5,963,556 A | * | 10/1999 | Varghese et al. | 370/401 |
| 6,393,483 B1 | * | 5/2002 | Latif et al. | 709/226 |
| 6,590,861 B1 | * | 7/2003 | Vepa et al. | 370/216 |
| 6,665,733 B1 | * | 12/2003 | Witkowski et al. | 709/249 |
| 7,443,799 B2 | * | 10/2008 | Varanasi et al. | 370/238 |
| 7,463,585 B2 | * | 12/2008 | Lindsay | 370/235 |
| 7,486,610 B1 | * | 2/2009 | Bhupalam et al. | 370/216 |
| 2005/0007951 A1 | * | 1/2005 | Lapuh et al. | 370/225 |
| 2006/0029097 A1 | | 2/2006 | McGee et al. | |
| 2006/0034190 A1 | | 2/2006 | McGee et al. | |
| 2007/0230357 A1 | * | 10/2007 | Lin et al. | 370/241.1 |
| 2007/0268903 A1 | * | 11/2007 | Nakagawa | 370/392 |
| 2008/0056120 A1 | * | 3/2008 | Jha et al. | 370/216 |

OTHER PUBLICATIONS

Broadcom Netextreme 57XX User Guide, Release: 57XX-UM103-R, Aug. 2005.*

* cited by examiner

*Primary Examiner* — Chirag Shah
*Assistant Examiner* — Amar Persaud

(57) ABSTRACT

A method and system of implementing virtual local area networks (VLANs) with teamed communication ports. At least some of the illustrative embodiments are methods comprising teaming a plurality of communication ports to form a single virtual communication port (the single virtual port comprising a first set of ports and a second set of ports), sending messages belonging to a first virtual local area network (VLAN) exclusively over the first set of ports from a first device to a second device, and sending messages belonging to a second VLAN exclusively over the second set of ports from the first device to the second device.

19 Claims, 4 Drawing Sheets

METHOD AND SYSTEM OF IMPLEMENTING VIRTUAL LOCAL AREA NETWORKS (VLANS) WITH TEAMED COMMUNICATION PORTS

BACKGROUND

In order to implement communication fault tolerance, and in some cases increase data throughput, a computer system may couple to a network by way of a plurality of communication ports (hereinafter just ports), with the ports either implemented on a single network interface card (NIC) or the ports implemented on multiple NICs. The ports are "teamed" or "aggregated" such that, regardless of the actual number of ports, the ports appear as a single virtual communication port.

Even though teamed ports appear as a single virtual port, for a variety of reasons (e.g., security) a plurality of virtual local area networks (VLANs) may operate over the single virtual port. For example, consider a server coupled to a plurality of workstation computers within a corporate location over the same physical network. For fault tolerance and to increase data throughput, the server may utilize a plurality of teamed communication ports. Some of the plurality of workstation computers may be operated by human resources, and others of the workstation computers may be operated by the engineering group. In order to keep the human resources systems separate from the engineering systems, the human resources workstation computers may belong to a first VLAN, while the engineering workstation computers may belong to a second VLAN. Thus, while the workstation computers actually communicate to the server over the same physical network, the workstation computers effectively and virtually reside on different networks.

Because the server needs to communicate with all of the workstation computers, and because communication may take place over any port of the single virtual port, each of the ports of the single virtual port belongs to each and every VLAN. Thus, regardless of the bandwidth requirements of a particular VLAN, each and every VLAN has equal access to bandwidth to and from the server.

BRIEF DESCRIPTION OF THE DRAWINGS

For a detailed description of illustrative embodiments, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices and connections.

DETAILED DESCRIPTION

The following discussion is directed to various embodiments. Although one or more of these embodiments may be preferred, the embodiments disclosed should not be interpreted, or otherwise used, as limiting the scope of the disclosure. In addition, one skilled in the art will understand that the following description has broad application, and the discussion of any embodiment is meant only to be exemplary of that embodiment, and not intended to intimate that the scope of the disclosure is limited to that embodiment.

Figure 1:
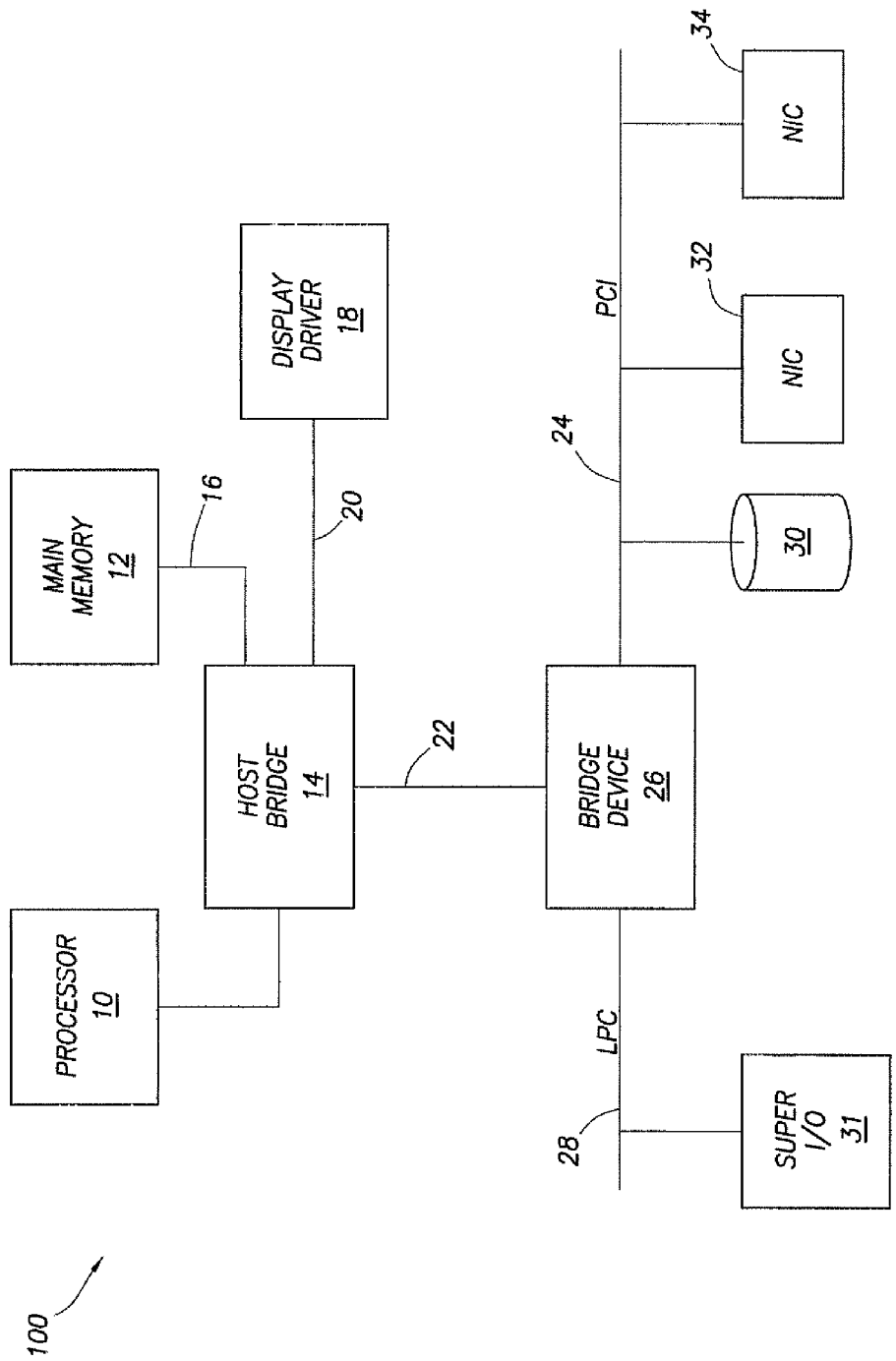
FIG. 1 illustrates a computer system in accordance with at least some embodiments.

FIG. 1 illustrates a computer system 100 in accordance with at least some embodiments. In particular, computer system 100 comprises at least one processor 10. In alternative embodiments the computer system 100 comprises multiple processors arranged in a configuration where parallel computing may take place. The processor 10 couples to a main memory array 12, and a variety of other peripheral computer system components, through a host bridge logic 14, although in some embodiments the host bridge logic 14 may be integrated with the processor 10. The main memory array 12 couples to the host bridge logic 14 through a memory bus 16. The host bridge logic 14 controls transactions to the main memory 12 by asserting control signals during memory accesses. The main memory 12 functions as the working memory for the processor 10 and comprises a memory device or array of memory devices in which program instructions and data are stored. The main memory array 12 may comprise any suitable type of memory, such as Dynamic Random Access Memory (DRAM) or any of the various types of DRAM devices such as Synchronous DRAM (SDRAM), Extended Data Output DRAM (EDO DRAM), or Rambus™ DRAM (RDRAM).

In some embodiments, text and video generated by software executing on the processor is provided to a display driver device 18 coupled to the host bridge 14 by way of an Advanced Graphics Port bus 20, PCI-Express, or other suitable type of bus. Alternatively, the display driver device could couple to the primary expansion bus 22 or one of the secondary expansion buses (i.e., the peripheral component interconnect (PCI) bus 24). The display device to which the display driver device 18 couples may comprise any suitable electronic display device upon which any image or text can be represented. In embodiments where the computer system 100 is a server system (e.g., in rack mounted enclosure with a plurality of other server systems), the display driver 18 may be omitted.

Computer system 100 also comprises a second bridge logic device 26 that bridges the primary expansion bus 22 to various secondary buses, such as a low pin count (LPC) bus 28, the PCI bus 24, and a Universal Serial Bus (USB). These secondary expansion buses are only illustrative, and other secondary expansion buses and bus protocols now in existence, or after-developed, may be equivalently used. In some embodiments, the bridge logic device 26 is an Input/Output (I/O) Controller Hub (ICH) manufactured by Intel Corporation. In the embodiments shown in FIG. 1 using an I/O Controller Hub as the second bridge logic device, the primary expansion bus 22 is a Hub-link bus, which is a proprietary bus of the Intel Corporation. However, computer system 100 is not limited to any particular chipset vendor, and thus other suitable buses as well as chipsets from other manufacturers may be equivalently used.

A Super Input/Output (I/O) controller 31 couples to the second bridge logic device 26 and controls many system functions. The Super I/O controller 31 may interface, for example, with a system pointing device, such as a mouse, a keyboard, and various serial ports and floppy drives. The Super I/O controller is referred to as "super" because of the many I/O functions it may perform. Because in some embodiments the computer system 100 is a server, the server may not have a dedicated mouse and keyboard.

Still referring to FIG. 1, the computer system 100 may further comprise a long term data storage device, such as disk drive system 30 coupled to the bridge logic device 26 by way of the illustrative PCI bus 24. The disk drive system 30 may be a single drive, or an array of drives operated as a redundant array of independent (or inexpensive) disks (RAID) system. While the illustrative disk drive system 30 is shown as coupled to the PCI bus 24, the disk drive system may equivalently couple to other buses, such as the primary expansion bus 22 or other secondary expansion buses.

The computer system 100 further comprises a plurality of network interface cards (NICs) or other form of network adapters. In the illustrative case of FIG. 1, the computer system 100 comprises NICs 32 and 34. The NICs 32 and 34 are message interfaces between the computer system 100 and one or more communication networks, such as an Ethernet network implementing a local area network (LAN) or wide area network (WAN). While FIG. 1 illustrates both NICs 32 and 34 coupled to the same PCI bus 24, in alternative embodiments the NICs may couple to different PCI buses, or buses having different communication protocols (e.g., one NIC coupled to the PCI bus, and a second NIC coupled to the primary expansion bus 22) to implement bus fault tolerance. Each NIC 32 and 34 implements at least one communication port, and each NIC may implement multiple communication ports. For example, a NIC may implement four or eight communication ports, and thus a NIC may implement four or eight separately controllable interfaces to four or eight different communication networks.

In accordance with some embodiments, two or more communication ports (hereinafter just "ports") may be grouped or teamed for purposes of fault tolerance and/or to increase communication throughput. Teamed ports may be implemented on the same NIC device, or the ports may span multiple NIC devices. Moreover computer system 100 may implement multiple teams. Teamed ports represent redundant links to the communication network, and in some cases each port may communicate over distinct paths or segments of the network that ultimately couple to a core switch.

If employed in a packet-switched network, each of the NICs 32 and 34 of FIG. 1 transmit to and receive from the network packets (e.g., Ethernet®) formatted packets) generated by clients on the network. The formatting of the packets is defined by the implemented transmission protocol. Each device on a network uses one or more unique addresses by which it communicates with the other devices on the network, with each address (corresponding to one of the layers of the OSI model) embedded in the packets for both the source device and the destination device. A device uses an address at layer 2 (the data link layer) known as a media access control (MAC) address and an address at layer 3 (the network layer) known as a protocol address (e.g., Internet Protocol (IP), IP eXchange (IPX), AppleTalk). The MAC address can be thought of as being assigned to the physical hardware of the device, such as the NIC, whereas the protocol address is assigned to the software of the device. When multiple protocols reside on the same network device, a protocol address is usually assigned to each resident protocol.

For Ethernet networks, devices communicate directly using their respective layer 2 MAC addresses, even though the software for each device initiates communication with one or more other network devices using their protocol addresses. Ethernet devices first ascertain the MAC address corresponding to a particular protocol address of a destination device. For the IP protocol, this is accomplished by first consulting a cache of MAC address/protocol address pairs maintained by each network device known as an ARP cache. If an entry for a particular protocol address is not present, a process is initiated whereby the sending device broadcasts a request to all devices on the network requesting that the device having the destination protocol address reply with its MAC address. Such a broadcast request is known as address resolution protocol (ARP) request, the result of which is then stored in the ARP cache for future use. The timeout period for entries in the ARP cache is dependent upon the operating system in use. Communication packets are formed by embedding the source and destination MAC addresses (48 bits each), as well as embedding the source and destination protocol addresses, in the payload of the packet. The source protocol address indicates to the receiving device the identity of the source device from which the packet was received and thus to which device to respond if a response is required. For the IPX protocol, the ARP process is not needed as the MAC address is a constituent of the IPX address.

Figure 2:
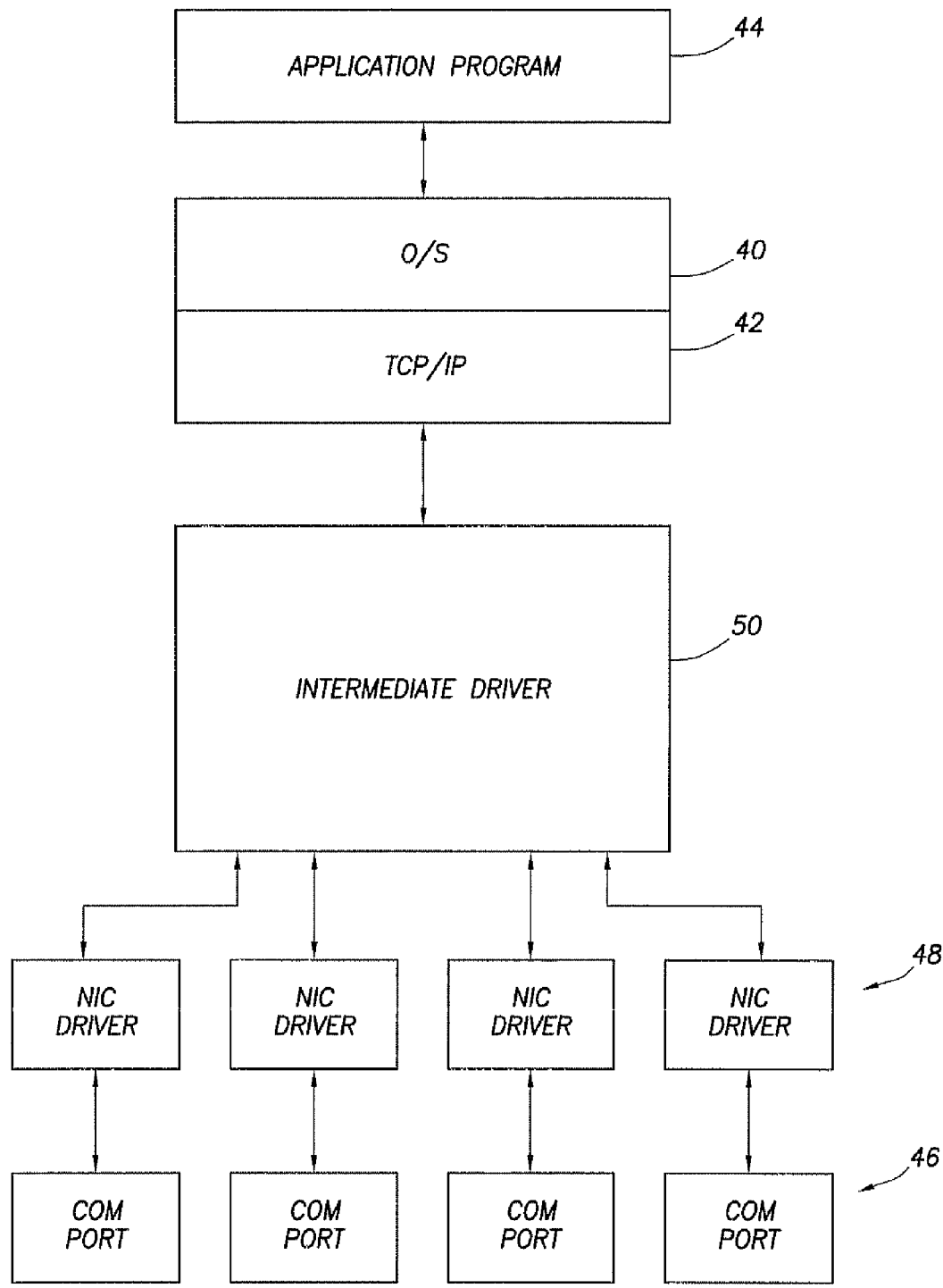
FIG. 2 illustrates the relationship of various software programs and/or drivers in accordance with some embodiments.

FIG. 2 illustrates the relationship of various pieces of software executed by the processor 10 to implement teaming in accordance with some embodiments. In particular, the computer system implements an operating system (O/S) 40 that supports networking. Any currently available or after developed operating system that supports networking may be used. In the illustrative case of FIG. 2, the operating system 40 supports a transmission control protocol/internet protocol (TCP/IP) stack 42, but other communication protocols may be implemented simultaneously or in the alternative (e.g., IPX, NetBUEI). The operating system 40, and in particular the illustrative TCP/IP protocol stack 42, enable one or more application programs 44 to communicate to other computer systems over a network.

Still referring to FIG. 2, each port 46 has associated therewith a NIC driver 48 (where each NIC driver may be alternatively referred to as a miniport driver). In cases where each NIC (e.g., NICs 32 and 34 of FIG. 1) are made by the same vendor and have the same capabilities, the NIC drivers 48 may be duplicate programs. However, the NICs need not be made by the same vendor or have the same capabilities. For example, one NIC may implement 100 megabit per second (Mbps) data throughput, while another NIC may implement 1000 Mbps (Gigabit) throughput, and in these alternative embodiments the NIC drivers may be vendor and/or capability specific. In spite of having different vendors and/or different capabilities, the various NICs, or their ports, may still be teamed in accordance with the various embodiments.

In situations where each port 46 operates independently or in a non-teamed manner, the illustrative TCP/IP stack 42 communicates directly with each NIC driver 48; however, in accordance with an embodiment the ports 46 are teamed such that they appear as a single communication port to the illustrative TCP/IP stack 42 and application program 44. To enable teaming, an intermediate driver 50 interfaces between the illustrative TCP/IP stack 42 and the various drivers 48. More particularly, the intermediate driver 50 communicates with the illustrative TCP/IP stack 42, and appears to the TCP/IP stack as a single NIC driver. Likewise, the intermediate driver 50 appears as a TCP/IP stack to each of the NIC drivers 48. Operation of the intermediate driver 50 to implement virtual local area network (VLAN) port teaming is introduced after a brief discussion VLANs and VLAN tagging.

Figure 3:
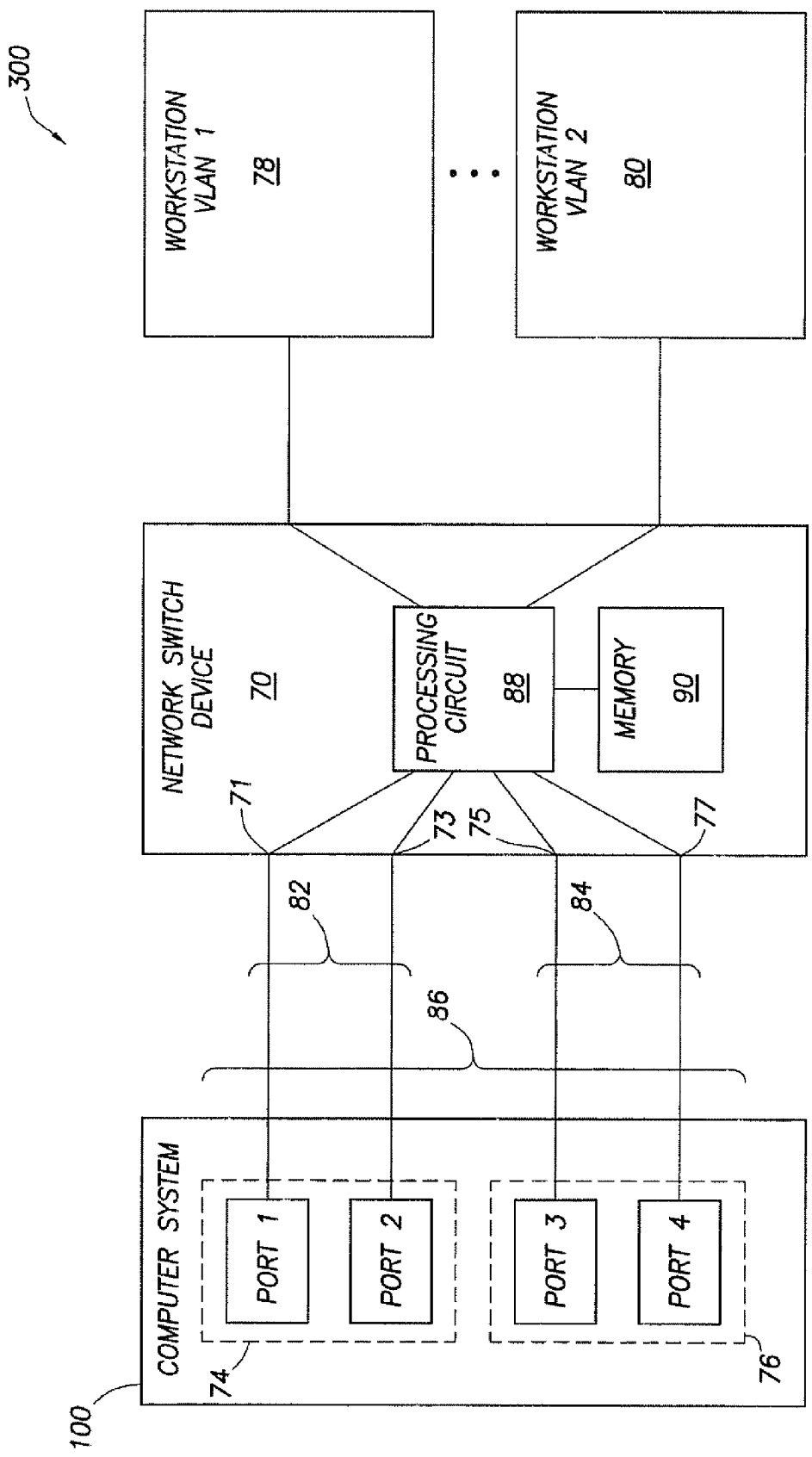
FIG. 3 illustrates a system in accordance with some embodiments.

FIG. 3 illustrates a system 300 implemented in accordance with at least some embodiments. In particular, FIG. 3 illustrates computer system 100 coupled to network switch device 70 (which switch device could be a layer 2 or layer 3 device). Of the four teamed ports of computer system 100, FIG. 3 shows that ports 1 and 2 are implemented by a single NIC 74, while ports 3 and 4 are implemented by a single NIC 76, but this implementation is merely illustrative. The four ports may be implemented on a single NIC (but such an implementation would not provide NIC redundancy), may be implemented on four separate NICs, or any combination where for ports are available. For purpose of discussion, assume that each port couples directly to its respective switch device by way of a Gigabit connection.

FIG. 3 further illustrates two workstation computers 78 and 80 coupled to the computer system 100. Consider for purposes of explanation that workstation computer 78, while being coupled to the same physical network as workstation computer 80, resides on VLAN 1. Further consider that workstation computer 80, while being coupled to the same physical network as workstation computer 78, resides on VLAN 2. In some embodiments, the workstations 78 and 80 are unaware of that multiple VLANs exist on the network. In these situations, a network administrator configures the network switch device 70 to associate particular ports with particular VLANs. Configuring a network switch device 70 to implement the VLANs on a port-by-port basis is referred to as a "port-based LAN."

In other embodiments, the one or more of the workstations 78 and 80 may operate on multiple VLANs, and devices in accordance with these embodiments utilize VLAN tagging. That is, each message packet that is sent from device operating on a particular VLAN includes a tag indicating to which VLAN the device, and therefore the message packet, belongs. The network switch device, in addition to forwarding messages based on the MAC addresses (if the switch device is a layer 2 device), also inspects the VLAN tag associated with each message and forwards based on the VLAN membership. For example, if workstation computer 78, being a member of VLAN 1, issues a broadcast message (message directed to every device on the network), the network switch device forwards the broadcast message only to devices that are members of the particular VLAN (e.g., the network switch device forwards the broadcast message to one or more ports of the teamed ports of computer system 100, but not to workstation computer 80).

If computer system 100 belongs to both of the illustrative VLANs, in the related art all the ports 1-4 of the teamed ports belong to both VLANs. Stated more generically, in the related art each port of a set of teamed communication ports must belong to each and every VLAN to which the device belongs. Having each port a member of each VLAN may be necessitated because message packets (regardless of VLAN membership) may be received by or transmitted from any of the teamed ports. The related art requirement of having each port be a member of each VLAN places all VLANs on equal footing with respect to bandwidth into and out of the computer system 100.

The various embodiments, however, perform VLAN-level port aggregation across ports of a set of teamed ports. In accordance with an embodiment, any port of a set of teamed ports (in the illustrative case of FIG. 3, ports 1-4) may be assigned to any, but not necessarily all, the VLANs with which computer system 100 communicates. Still referring to FIG. 3, consider an illustrative situation where ports 1-4 of the computer system 100 are aggregated or teamed. Further consider that three VLANs are implemented in the system in the following manner: a first VLAN assigned to ports 1-2 (illustrated by bracket 82), a second VLAN assigned to ports 34 (illustrated by bracket 84); and a third VLAN assigned to all the ports (illustrated by bracket 86).

In accordance with some embodiments, message packets belonging to a particular VLAN are transmitted exclusively over the ports assigned to the VLAN, even though the assigned ports themselves are teamed or aggregated with other ports not assigned to the VLAN. If a VLAN is assigned to multiple ports, the message packets may be transmitted from a single port of the multiple ports, or the message packet transmission may be load-balanced across the ports assigned to the VLAN. Regardless of the port through which the message packets are sent, the message packets are sent using the MAC address of the team (the MAC address of the primary port), and thus the actual MAC address assigned to the port may be different than the MAC used in sending the message packet.

In the illustrative situation of FIG. 3, message packets belonging to the first VLAN 82 are transmitted from the computer system 100 exclusively on the ports 1 or 2. Message packets belonging to the second VLAN 84 are transmitted from the computer system 100 exclusively on the ports 3 or 4. Message packets belonging to the third VLAN 86 are transmitted from the computer system 100 on any of the ports 1-4. In situations where VLAN port assignments overlap, load-balancing in the transmission of any particular message packet may take into account message packets transmitted from the same VLAN, and in some embodiments message packets from different VLANs transmitted over the commonly assigned ports.

Returning to FIG. 2, in order to implement multiple VLANs in accordance with the various embodiments, the intermediate driver 50 creates a virtual NIC interface, one each for each VLAN. The TCP/IP stack 42, being unaware of the existence of VLANs, sends message packets (belonging to particular VLANs) to particular virtual NIC interfaces. The intermediate driver 50 associates each virtual NIC interface with a particular VLAN, and when the TCP/IP stack sends a message packet to a particular virtual NIC interface, the intermediate 50 driver directs the message packet exclusively to the ports associated with the VLAN, and may tag the message packets with a VLAN tag. In some embodiments, the intermediate driver transmits all the message packets belonging to a particular VLAN from a single port, or the intermediate driver may load balance message packet transmission among the ports assigned to the VLAN, as discussed above.

Implementing a system such as that shown in FIG. 3 provides NIC redundancy within the computer system 100. By selectively assigning sets or subsets of the ports to particular VLANs, the bandwidth available to each VLAN may be advantageously controlled. Moreover, while the discussion has assumed that the bandwidth or throughput of each connection between the computer system 100 and the network switch device 70 is the same, one may implement teaming or aggregation with ports having different bandwidth capabilities. Thus, the VLAN-level port aggregation (of otherwise teamed ports) allows the end-user to advantageously select ports for particular VLANs taking into account the differing bandwidth capabilities.

The discussion to this point focused on message packet transmission from the computer system 100 to downstream devices, such as workstation computers 78 and 80 through network switch device 70. However, in the illustrative situation of FIG. 3 computer system 100 also receives message packets belonging to different VLANs. In order to distribute the message packets to be received by the computer system 100 to the proper ports, network switch device 70 may participate in the VLAN-level port aggregation.

Network switch device 70 may comprise a processing circuit 88. The processing circuit may be an application specific integrated circuit (ASIC), discrete digital processing components, a processor that executes instructions, or a combination of any of these. The processing circuit 88 couples to each port of the switch, and also may couple to a memory 90. The memory 90 may be volatile or non-volatile. The network switch device 70 performs message packet switching between the various ports. In accordance with some embodiments, the network switch device 70 also performs port aggregation in accordance with the Institute of Electrical and Electronics Engineers (IEEE) 802.3ad standard. For example, and still referring to FIG. 3, network switch device 70 may aggregate ports 71, 73, 75 and 77 under IEEE 802.3ad standard to correspond to the teaming of ports 1-4 of computer system 100. The port aggregation to conform to the IEEE 802.3ad standard may take any suitable form, and the implementation may vary between vendors. For example, rather than utilize a single content addressable memory (CAM) table for each port, the network switch device may utilize a single CAM table for the aggregated ports.

In addition to the above-noted capabilities of the network switch device 70, in accordance with some embodiments the network switch device 70 performs VLAN-level port aggregation with respect to ports already aggregated in conformance with the IEEE 802.3ad standard. In particular, in accordance with these embodiments the processing circuit 88 is aware of the VLAN-level port aggregation, and forwards message packets belonging to particular VLANs exclusively to ports on the receiving device (in the case of FIG. 3, computer system 100) that are assigned to the VLAN. In some embodiments, the network switch device 70 may implement a CAM table for each VLAN. Thus, the discussion above with respect to computer system 100 transmitting message packets is equally applicable to network switch device 70 forwarding message packets received on any of its ports.

Figure 4:
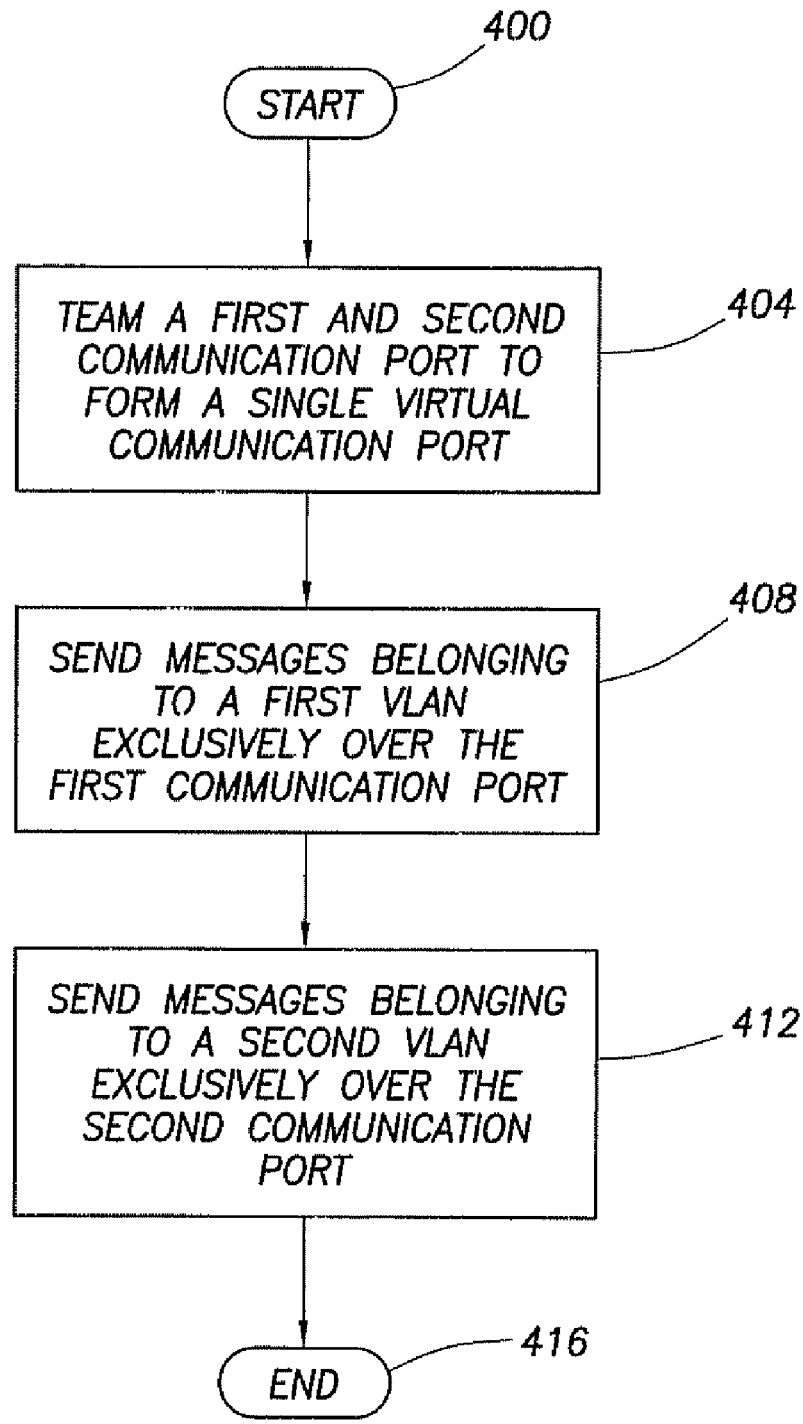
FIG. 4 illustrates a method in accordance with at least some embodiments.

FIG. 4 illustrates a method in accordance with at least some embodiments. The method may be implemented in a computer system, such as computer system 100, or the method may be implemented in a network switch device, such as network switch device 70. In particular, the method starts (block 400) and proceeds to teaming a first and second (or more) communication ports to form a single virtual communication port (block 404). In computer system 100, the teaming may be implemented by intermediate driver 50, whereas in the network switch device 70 the teaming may be referred to as "port trunking" and may be implemented by the processing circuit 88.

Regardless of where implemented, after the teaming is complete a first message belonging to a first VLAN is sent exclusively over the first communication port (block 404). In cases where multiple ports are assigned to a particular VLAN, the sending may be over any of the ports assigned to the particular VLAN, and in some cases the sending device may load balance the sending across the multiple ports.

The method then moves to sending messages belonging to a second VLAN exclusively over the second communication port (block 412), and the method ends (block 416). In cases where multiple ports are assigned to a particular VLAN, the sending may be over any of the ports assigned to the particular VLAN, and in some cases the sending device may load balance the sending across the multiple ports.

From the description provided herein, those skilled in the art are readily able to combine software created as described with appropriate general purpose or special purpose computer hardware to create a computer system and/or computer subcomponents embodying the invention, to create a computer system and/or computer subcomponents for carrying out the method of the invention, and/or to create a computer-readable media for storing a software program to implement the method aspects of the invention.

The above discussion is meant to be illustrative of the principles and various embodiments of the present invention. Numerous variations and modifications will become to those skilled in the art once the above disclosure is fully appreciated. It is intended that the following claims be interpreted to embrace all such variations and modifications.

What is claimed is:

1. A method comprising:
teaming a plurality of communication ports to form a single virtual communication port, the single virtual port comprising a first set of ports and a second set of ports;
sending messages belonging to a first virtual local area network (VLAN) exclusively over the first set of ports from a first device to a second device;
sending messages belonging to a second VLAN exclusively over the second set of ports from the first device to the second device; and
sending messages belonging to a third VLAN over either of the first or second set of ports of the virtual communication port.

2. The method as defined in claim 1 wherein each sending further comprises sending from the first device being a computer system.

3. The method as defined in claim 2 wherein each sending further comprises sending to a network switch device.

4. The method as defined in claim 1 wherein each sending further comprises sending from the first device being a network switch device.

5. The method as defined in claim 1 wherein the first set of ports comprises one or more selected from the group: a single communication port; or a plurality of communication ports.

6. A communication system comprising:
a processor;
a memory coupled to the processor;
a plurality of communication ports coupled to the processor, the plurality of communication ports teamed to form a single virtual communication port;
wherein the processor is configured to send message packets belonging to a first virtual local area network (VLAN) exclusively over a first communication port of the single virtual communication port, and wherein the processor is configured to send message packets belonging to a second VLAN exclusively over a second communication port of the single virtual communication port; and
wherein the processor is further configured to send message packets belonging to a third VLAN over either the first or second communication port of the single virtual communication port.

7. The communication system as defined in claim 6 further comprising a plurality of network interface cards (NICs), each NIC providing at least one of the plurality of communication ports.

8. The communication system as defined in claim 6 further comprising:
- a first network interface card (NIC) coupled to the processor and providing the first communication port;
- a second NIC coupled to the processor and providing the second communication port.

9. The communication system as defined in claim 6 further comprising a network interface card (NIC) coupled to the processor and providing both the first and second communication ports.

10. The communication system as defined in claim 6 wherein the communication system is a computer system that couples to a communication network.

11. The communication system as defined in claim 6 further comprising:
- wherein the communication system is a network switch device; and
- wherein the processor is an application specific integrated circuit that operates the network switch device.

12. A non-transitory computer-readable medium storing a program that, when executed by a processor, causes the processor to:
- send messages belonging to a first virtual local area network (VLAN) exclusively over a first communication port subset of a set of teamed communication ports;
- send messages belonging to a second VLAN exclusively over a second communication port subset of the set of teamed communication ports; and
- send messages belonging to a third VLAN over any of the first, second or a third communication port subsets of the set of teamed communication ports;
- wherein said set of teamed communication ports comprise multiple ports logically combined together to be accessible as a single port.

13. The computer-readable medium as defined in claim 12 wherein when the processor sends the program causes the processor to send from a computer system.

14. The computer-readable medium as defined in claim 12 wherein when the processor sends the program causes the processor to send from a network switching device.

15. A system comprising:
- a processing circuit;
- a memory coupled to the processing circuit;
- a first, second and third communication ports coupled to the processing circuit, the first, second and third communication ports aggregated to form a single virtual communication port;
- wherein the processing circuit sends messages belonging to a first virtual local area network (VLAN), as between first through third communication ports, exclusively over the first or second communication ports, and wherein the processing circuit communication architecture enables the first VLAN to exclusively communicate over the first and second communication ports;
- wherein the processing circuit sends messages belonging to a second VLAN, as between the first through third communication ports, exclusively over the third communication port; and
- wherein the processing circuit sends messages belonging to a third VLAN over any port of the single virtual communication port wherein the processing circuit communication architecture enables all communication ports to communicate exclusively through third VLAN.

16. The system as defined in claim 15 further comprising:
- a fourth communication port coupled to the processing circuit, the fourth communication port aggregated with the first, second and third communication ports to form the single virtual communication port;
- wherein the processing circuit sends messages belonging to the second VLAN, as between the first through fourth communication ports, exclusively over the third or fourth communication ports; and
- wherein the processing circuit sends messages belonging to the third VLAN over any port of the single virtual communication port.

17. The system as defined in claim 15 wherein the processing circuit, memory and communications ports are implemented in a computer system.

18. The system as defined in claim 15 wherein the processing circuit, memory and communications ports are implemented in a network switching device.

19. The system as defined in claim 15 wherein when the processing circuit sends messages belonging to a third VLAN over any port of the single virtual communication port the processing circuit load balances the messages across the ports of the single virtual communication port.

* * * * *